(12) United States Patent
Karnes (10) Patent No.: US 6,796,285 B2
(45) Date of Patent: Sep. 28, 2004

(54) INTERNAL COMBUSTION ENGINE

(75) Inventor: Mark D. Karnes, Columbia, KY (US)

(73) Assignee: Karnes Dyno-Rev Engine, Inc., Columbia, KY (US)

( * ) Notice: Subject to any disclaimer, the term of this patent is extended or adjusted under 35 U.S.C. 154(b) by 0 days.

(21) Appl. No.: 10/338,414

(22) Filed: Jan. 8, 2003

(65) Prior Publication Data

US 2003/0127067 A1 Jul. 10, 2003

Related U.S. Application Data

(60) Provisional application No. 60/347,006, filed on Jan. 9, 2002.

(51) Int. Cl.⁷ ............................ F02B 53/00; F01C 21/00
(52) U.S. Cl. .................. 123/241; 123/18 R; 123/43 C; 123/43 R; 418/178
(58) Field of Search ................................ 123/241, 243, 123/43 R, 18 R, 43 C; 418/268, 267, 260, 178

(56) References Cited

U.S. PATENT DOCUMENTS

| | | | | |
|---|---|---|---|---|
| 1,400,255 A | * | 12/1921 | Anderson | 123/241 |
| 1,922,363 A | * | 8/1933 | Hapkins | 123/243 |
| 1,923,561 A | | 8/1933 | Winckler | |
| 2,121,660 A | * | 6/1938 | Hammers | 123/241 |
| 3,438,358 A | * | 4/1969 | Porsch et al. | 123/241 |
| 3,540,816 A | | 11/1970 | Alcolea | |
| 3,726,259 A | | 4/1973 | Graves | |
| 3,765,379 A | | 10/1973 | Thomas | |
| 3,855,977 A | * | 12/1974 | Statkus | 123/43 C |
| 3,923,013 A | * | 12/1975 | Myers | 123/241 |
| 3,934,321 A | * | 1/1976 | Iida et al. | 418/178 |
| 4,055,156 A | | 10/1977 | Salguero | |
| 4,144,866 A | * | 3/1979 | Hakner | 123/241 |
| 4,401,070 A | | 8/1983 | McCann | |
| 4,552,107 A | | 11/1985 | Chen | |
| 4,667,468 A | | 5/1987 | Hansen | |
| 4,966,102 A | | 10/1990 | Mulakken | |
| 5,220,893 A | | 6/1993 | Costa | |
| 5,359,971 A | | 11/1994 | Haven | |
| 5,375,987 A | | 12/1994 | Brent | |
| 5,415,141 A | | 5/1995 | McCann | |
| 5,540,199 A | | 7/1996 | Penn | |
| 5,571,005 A | | 11/1996 | Stoll et al. | |
| 5,709,188 A | | 1/1998 | Al-Qutub | |
| 5,711,268 A | * | 1/1998 | Holdampf | 123/243 |
| 5,865,152 A | | 2/1999 | Murphy et al. | |
| 6,125,814 A | | 10/2000 | Tang | |

FOREIGN PATENT DOCUMENTS

| | | | | |
|---|---|---|---|---|
| DE | 23 43 909 A1 | * | 3/1975 | ............ F01C/1/38 |
| DE | 25 10 588 A1 | * | 9/1975 | ............ F01C/1/40 |
| EP | 103985 A2 | * | 3/1984 | ........... F01B/13/06 |
| JP | 55069726 A | * | 5/1980 | ........... F02B/55/08 |
| WO | WO 01/86119 A1 | * | 11/2001 | ............... 123/43 C |

\* cited by examiner

*Primary Examiner*—Thomas Denion
*Assistant Examiner*—Thai-Ba Trieu
(74) *Attorney, Agent, or Firm*—Stites & Harbison, PLLC; David W. Nagle, Jr.

(57) ABSTRACT

An internal combustion engine that has a torque wheel mounted for rotation within the central cavity defined by the housing and driving a crankshaft. The torque wheel has a plurality of arms in a spaced arrangement about the center of the torque wheel, thereby defining a plurality of corresponding volumes between the respective arms. A plurality of substantially identical combustion gates are positioned within these corresponding volumes, each combustion gate being mounted for rotation within a respective volume about a pivot pin. Rotation of the combustion gates about the respective pivot pins and resultant inward and outward movement of the combustion gates relative to the center of the torque wheel achieves a four-stroke combustion cycle.

20 Claims, 10 Drawing Sheets

FIG.11A

INTERNAL COMBUSTION ENGINE

CROSS REFERENCE TO RELATED APPLICATION

This application claims priority from U.S. Provisional Application Serial No. 60/347,006 filed Jan. 9, 2002, and relates to an internal combustion engine. The entire disclosure contained in U.S. Provisional Application Serial No. 60/347,006 is incorporated herein by this reference.

BACKGROUND OF THE INVENTION

The present invention relates to internal combustion engines. In an internal combustion engine, the basic functionality includes: (1) the intake of a fuel-air mixture into a combustion chamber, (2) the compression of the fuel-air mixture, (3) the ignition of the fuel-air mixture, and (4) the expansion of the ignited mixture and exhausting of the combustion gases. The resultant release of energy in the form of expanding gas is used to power various mechanical devices, including vehicles.

A reciprocating internal combustion engine is perhaps the most common form of internal combustion engine. In a reciprocating internal combustion engine, the reciprocating motion of a piston in a cylinder results in the compression of the fuel-air mixture and the expansion of combustion gases. The energy is transformed from linear motion into rotational motion through connection of the piston to a crankshaft.

Most modern vehicle engines currently use a piston-cylinder arrangement in what is referred to as a four-stroke combustion cycle, comprised of (1) an intake stroke, (2) a compression stroke, (3) a combustion stroke, and (4) an exhaust stroke. In a four-stroke combustion cycle using a typical piston-cylinder arrangement, the piston starts at the top of the combustion chamber (i.e., the cylinder), and an intake valve opens. The piston moves downwardly within the cylinder, and the fuel-air mixture is drawn into the cylinder through the intake valve, completing the intake stroke. The piston then moves back upwardly to compress the fuel-air mixture until reaching the top of the stroke, completing the compression stroke. When the piston reaches the top of the stroke, the spark plug ignites the compressed fuel-air mixture, resulting in a controlled explosion that drives the piston downwardly, completing the combustion stroke. Finally, once the piston reaches the bottom of its stroke, an exhaust valve opens, and combustion gases are forced out of the cylinder by the upward movement of the piston back to the top of its stroke, completing the exhaust stroke and readying the piston for a subsequent combustion cycle.

Although common in vehicles, a reciprocating internal combustion engine using a four-stroke combustion cycle does have some disadvantages. As a result, other engines have been developed that use the same basic combustion principles with some variation. For example, in an internal combustion engine using a two-stroke combustion cycle, the intake and exhaust valves are eliminated. Instead, intake and exhaust ports are located on opposite sides of the cylinder. After each expansion stroke, combustion gases under pressure exit the cylinder through the exhaust port, and a fuel-air mixture is drawn in through the intake port. Although there is only one expansion cycle per crankshaft revolution, a two-cycle engine is must less efficient than a four-cycle engine.

Another reciprocating internal combustion engine is a diesel engine, which can have a four-stroke or a two-stroke combustion cycle. Unlike the above-described engines, however, a diesel engine draws in and compresses only air in the cylinder. This air is compressed by the piston to more than 450 psi, resulting in an air temperature of about 900–1100° F. At the bottom of the compression stroke, diesel fuel is injected into the cylinder, and the temperature of the air within the cylinder is sufficient to cause ignition of the fuel-air mixture without the need for a spark plug.

In any event, a reciprocating internal combustion engine has its disadvantages. The piston has a significant mass and thus inertia, which can cause vibration during motion and limits the maximum rotational speed of the crank shaft. Furthermore, such engines have relatively low mechanical and fuel efficiencies.

As a result of such disadvantages, some attempts have been made to propose alternate combustion engine designs. Perhaps the most well-known and commercially successful of these alternate designs is the Wankel or rotary piston engine. The Wankel engine has a quasi-triangular rotating piston that moves along an eccentric path to rotate the crankshaft. Rather than using inlet and exhaust valves, the edges of the rotating piston open and close ports in the wall of the combustion chamber. In other words, intake and exhaust timing are controlled solely by the motion of the rotor.

As the piston of the Wankel engine rotates, seals mounted at its three corners continuously sweep along the wall of the combustion chamber. The enclosed volumes formed between the piston and the wall increase and decrease through each revolution of the piston. A fuel-air mixture is drawn into an enclosed volume, compressed by the rotation of the piston that decreases the enclosed volume, and then ignited with the combustion gases being accommodated by and expelled through the expansion of the enclosed volume. In short, a complete four-stroke combustion cycle is achieved, but since there is no reciprocating motion, higher rotational speeds are possible.

The most pronounced disadvantage of a Wankel or rotary piston engine is the difficulty in adequately sealing the enclosed spaces between the piston and the wall of the combustion chamber that increase and decrease through each revolution of the piston. If these enclosed spaces are allowed to communicate with another, the engine can not properly function.

Since development of the Wankel engine, other attempts have been made to improve upon its operation. For example, U.S. Pat. No. 5,415,141 describes and claims an engine that has a central rotor and a plurality of radially sliding vanes. The vanes rotate clockwise with the rotor to form enclosed volumes between the vanes, the side walls of the combustion chamber, and the rotor. These enclosed volumes decrease and increase in volume throughout the combustion cycle, with the fuel-air mixture being drawn into an enclosed volume, compressed by the rotation of the rotor and associated vane, and then ignited with the combustion gases being accommodated by and expelled through the expansion of the enclosed volume. Nevertheless, as with a Wankel engine, such a design still suffers from the problem of adequate sealing of the enclosed volumes from one another. Furthermore, the drag of the vanes along the wall of the combustion chamber reduces power and fuel efficiency.

It is therefore an object of the present invention to provide an improved internal combustion engine that avoids the problems of common reciprocating motion, piston-type engines.

It is a further object of the present invention to provide an improved internal combustion engine that avoids the sealing and efficiency problems of rotary combustion engines.

These and other objects and advantages of the present invention will become apparent upon a reading of the following description along with the appended drawings.

SUMMARY OF THE INVENTION

The present invention is an internal combustion engine that is generally comprised of a torque wheel mounted for rotation within a housing and driving a crankshaft. The housing defines a central cavity (or combustion chamber) in which the torque wheel and associated components of the engine are enclosed. The torque wheel includes a plurality of separate arms in a spaced arrangement about the center of the torque wheel, thereby defining corresponding volumes between the respective arms. Positioned within these volumes are substantially identical combustion gates. Although not directly secured to the torque wheel, the shape of the combustion gates causes them to be tightly retained and oriented relative to the torque wheel.

As the torque wheel rotates, the combustion gates are moved through an elliptical path. Air is drawn into the central cavity of the housing and fuel is introduced into the central cavity of the housing to create a fuel/air mixture in one of the volumes between the respective arms of said torque wheel and adjacent one of the combustion gates. This fuel/air mixture is then compressed during the continuing rotation of the torque wheel by the pivoting and outward movement of the combustion gate. The fuel/air mixture is then ignited, causing a rapid expansion of combustion gases and imparting a torque that causes continued rotation of the torque wheel. The combustion gate then pivots and moves inwardly toward the center of the torque wheel, allowing the combustion gases to expand, and then pivots and move outwardly again, forcing the combustion gases through an exhaust outlet.

DESCRIPTION OF THE DRAWINGS

FIG. 12 is an enlarged view of one of the star-shaped sealing members which serves to interconnect the elongated seals arrayed about the periphery of the respective seal plates of the preferred engine of FIG. 1.

DETAILED DESCRIPTION OF THE INVENTION

The present invention is an internal combustion engine that has a torque wheel mounted for rotation within the central cavity defined by the housing and driving a crankshaft. The torque wheel has a plurality of arms in a spaced arrangement about the center of the torque wheel, thereby defining a plurality of corresponding volumes between the respective arms. A plurality of substantially identical combustion gates are positioned within these corresponding volumes, each combustion gate being mounted for rotation within a respective volume about a pivot pin. Rotation of the combustion gates about the respective pivot pins and resultant inward and outward movement of the combustion gates relative to the center of the torque wheel achieves a four-stroke combustion cycle.

FIGS. 1–4 are various sectional views of a preferred internal combustion engine 10 made in accordance with the present invention. The engine 10 is generally comprised of a torque wheel 12 (also referred to as a balance wheel) mounted for rotation within a housing and driving a crankshaft 14. The housing generally comprises a front portion 80, a center portion 81, and rear portion 82. These portions 80, 81, 82 collectively define a central cavity (or combustion chamber) in which the torque wheel 12 and associated components of the engine 10 are enclosed, as is further described below. Although not essential to the present invention, as illustrated in the various Figures, the housing portions 80, 81, 82 are preferably secured together by a plurality of bolts or similar fasteners arrayed around the circumference of the housing.

In this preferred embodiment, the torque wheel 12 includes three separate arms in a spaced arrangement about the center of the torque wheel 12, thereby defining three corresponding volumes between the respective arms. Positioned within these volumes are substantially identical combustion gates 20, 22, 24. Although not directly secured to the torque wheel 12, the shape of the combustion gates 20, 22, 24 causes them to be tightly retained and oriented relative to the torque wheel 10. Although there are three separate arms and associated combustion gates 20, 22, 24 in this particular embodiment, fewer or more arms and gates could be incorporated into the engine 10 of the present invention without departing from the spirit and scope of the present invention.

Figure 1:
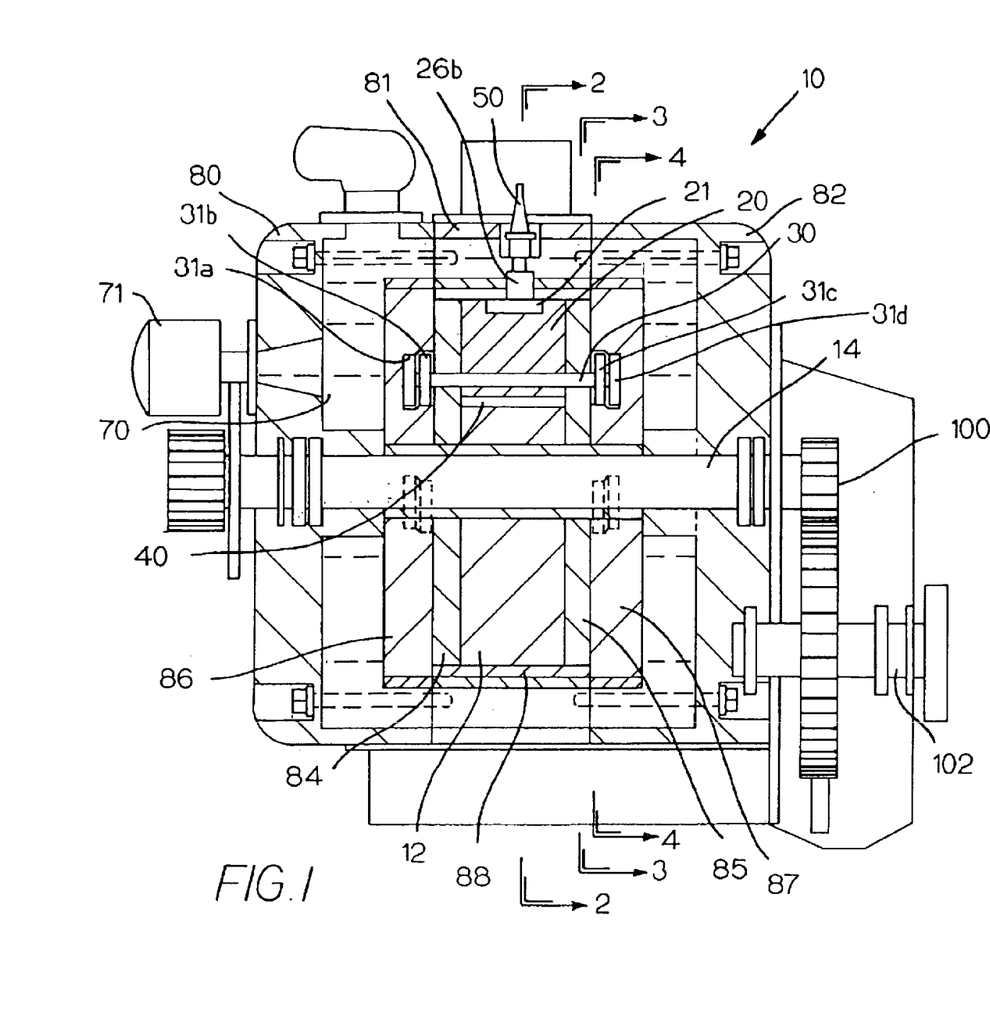
FIG. 1 is a sectional view of a preferred internal combustion engine made in accordance with the present invention.
Figure 2:
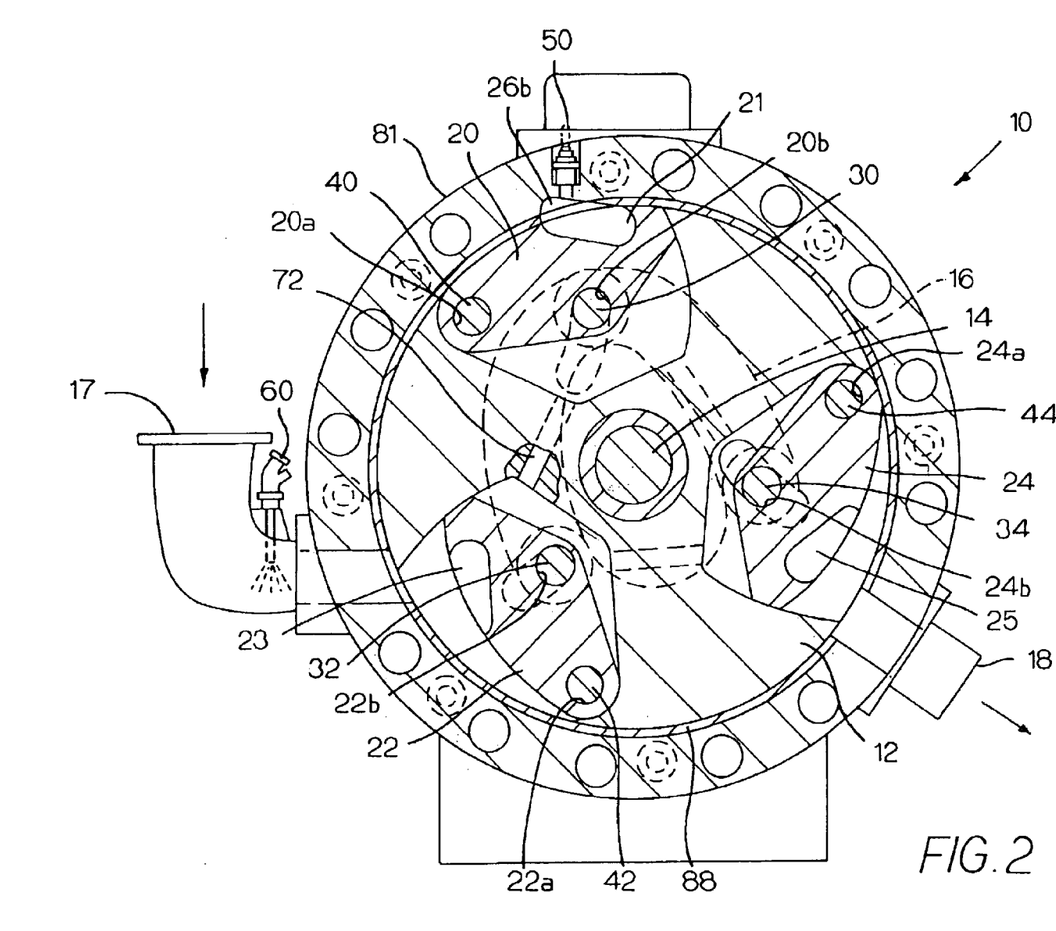
FIG. 2 is a sectional view of the preferred internal combustion engine of FIG. 1 taken along line 2—2 of FIG. 1.

As best shown in FIG. 2, each combustion gate 20, 22, 24 is mounted for rotation within the volumes between the respective arms of the torque wheel about a respective pivot pin 40, 42, 44, each such pivot pin passing through a respective first opening 20a, 22a, 24a defined through each combustion gate 20, 22, 24. Referring back to FIG. 1, it can be seen that each pivot pin 40, 42, 44 is received in corresponding apertures in the surface of seal plates 84, 85. In this regard, it can be appreciated that the torque wheel 10 and the combustion gates 20, 22, 24 are enclosed within the seal plates 84, 85, essentially creating a unitary body that rotates within a circumferential sleeve 88. The seal plates 84, 85 and this sleeve 88, which is preferably constructed of cast iron, are contained within the central cavity collectively defined by the front portion 80, center portion 81, and rear portion 82 of the housing.

Figure 3:
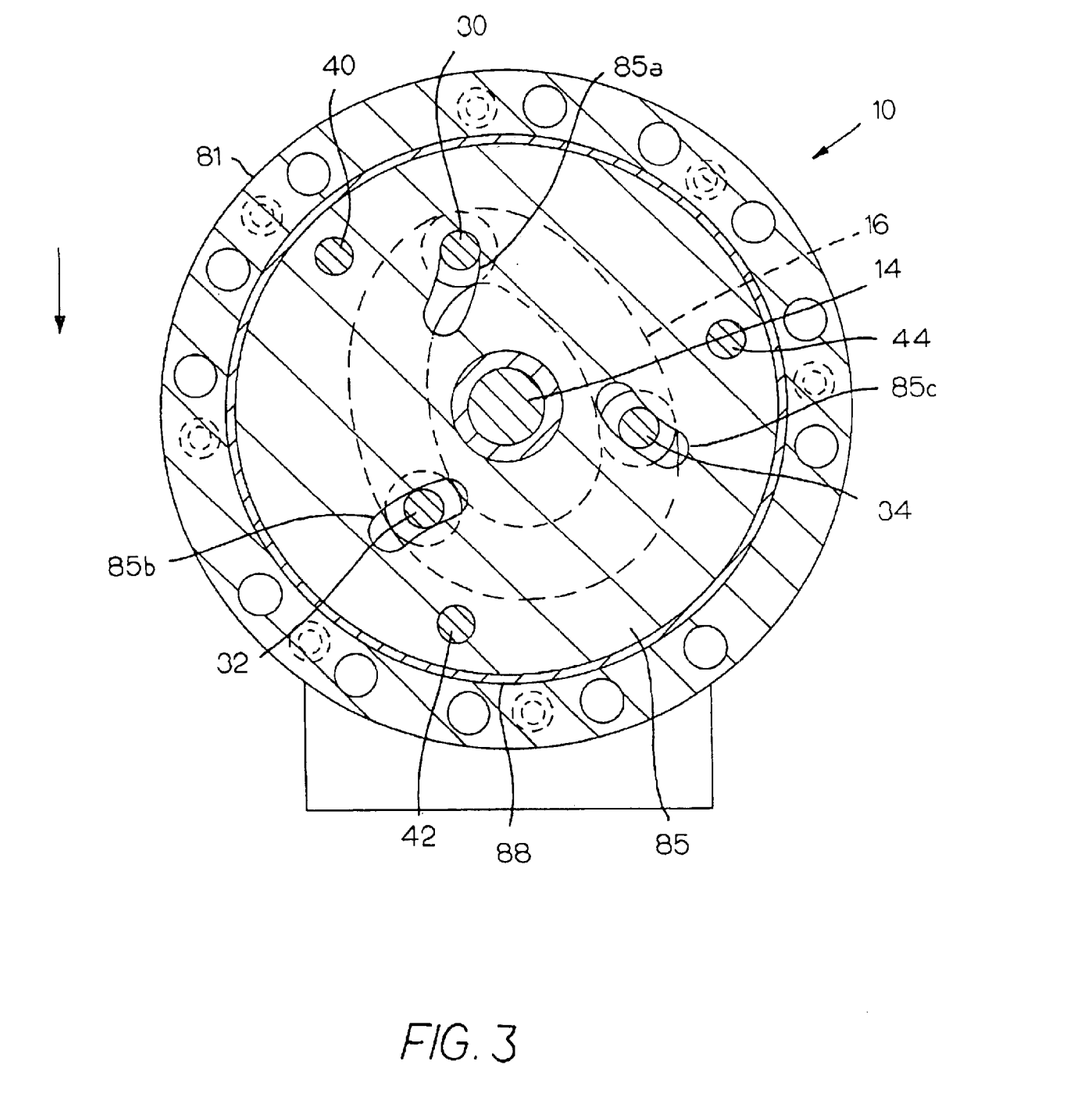
FIG. 3 is a sectional view of the preferred internal combustion engine of FIG. 1 taken along line 3—3 of FIG. 1.
Figure 4:
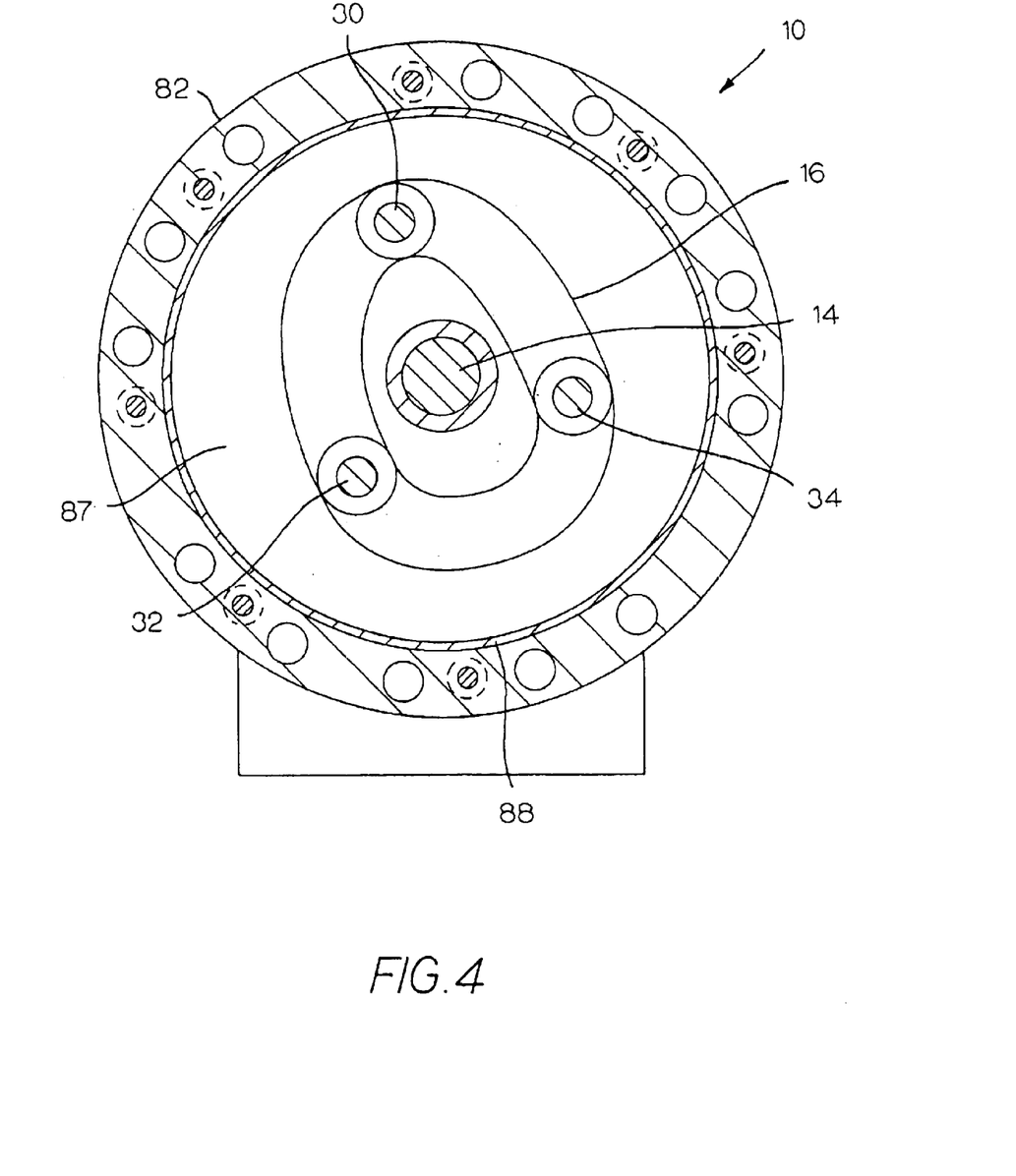
FIG. 4 is a sectional view of the preferred internal combustion engine of FIG. 1 taken along line 4—4 of FIG. 1.
Figure 10:
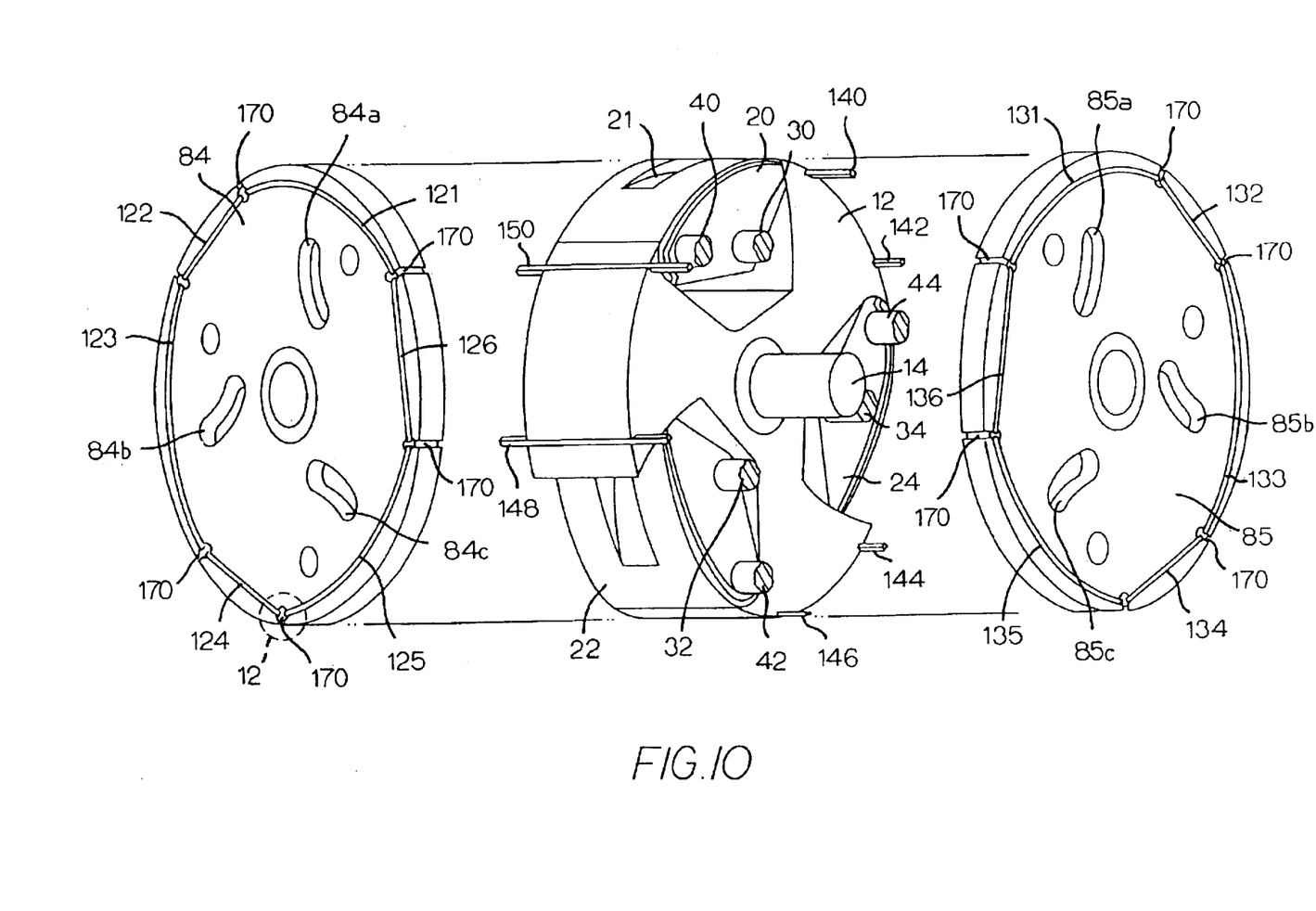
FIG. 10 is an exploded perspective view of the torque wheel, combustion gates, and seal plates of the preferred engine of FIG. 1, illustrating the positioning and orientation of the preferred seals.

The preferred engine 10 also includes elliptical cam cutouts 16 which serve as a track to guide the movement of the combustion gates 20, 22, 24. Specifically, the engine 10 includes cam cutout plates 86, 87 positioned adjacent the seal plates 84, 85 on either side of the torque wheel 12 and within the central cavity collectively defined by the front portion 80, center portion 81, and rear portion 82 of the housing. As best shown in FIG. 4, an elliptical cutout 16 is defined in the cam cutout plate 87 which serves as a track to guide the movement of the combustion gates 20, 22, 24. In this regard, as best shown in FIG. 3, there are curved slots 85a, 85b, 85c defined through the seal plate 85 such that cam guide pins 30, 32, 34 associated with the respective combustion gates 20, 22, 24 can pass through the seal plate 85 and be received in the elliptical cutout 16. Of course, similar slots 84a, 84b, 84c (as shown in FIG. 10) are defined through the second seal plate 84 to provide access to an identical elliptical cutout defined in the other cam cutout plate 86.

Referring now to FIG. 2, each combustion gate 20, 22, 24 also defines a second opening 20b, 22b, 24b therethrough. The cam guide pins 30, 32, 34 mentioned above pass through these openings 20b, 22b, 24b and are received in the elliptical cutouts 16, such that the pivoting of the combustion gates 20, 22, 24 is controlled by the elliptical cutouts 16. Specifically, because of the respective cam guide pins 30, 32, 34 and the elliptical shape of the cutouts 16, the combustion gates 20, 22, 24 are moved in and out with respect to the center of the torque wheel 12, each combustion gate 20, 22, 24 pivoting about its respective pivot pin 40, 42, 44.

Figure 5:
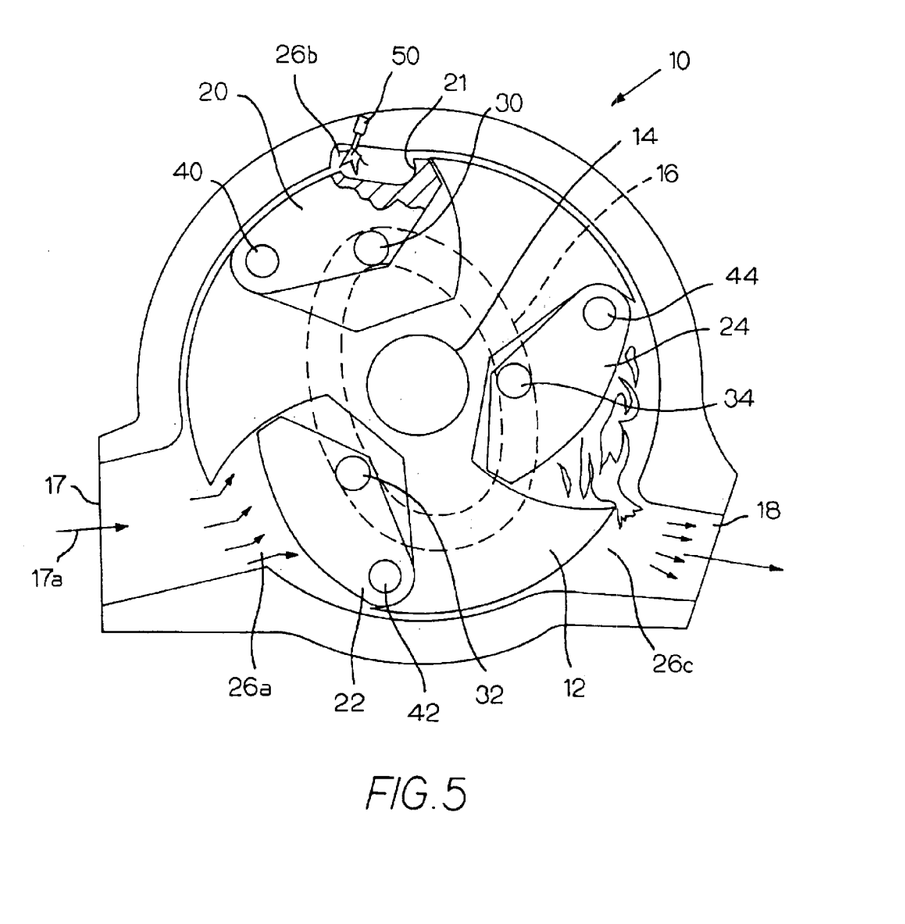
FIG. 5 is a simplified sectional view of the a preferred internal combustion engine made in accordance with the present invention, illustrating the operation of the engine.
Figure 6:
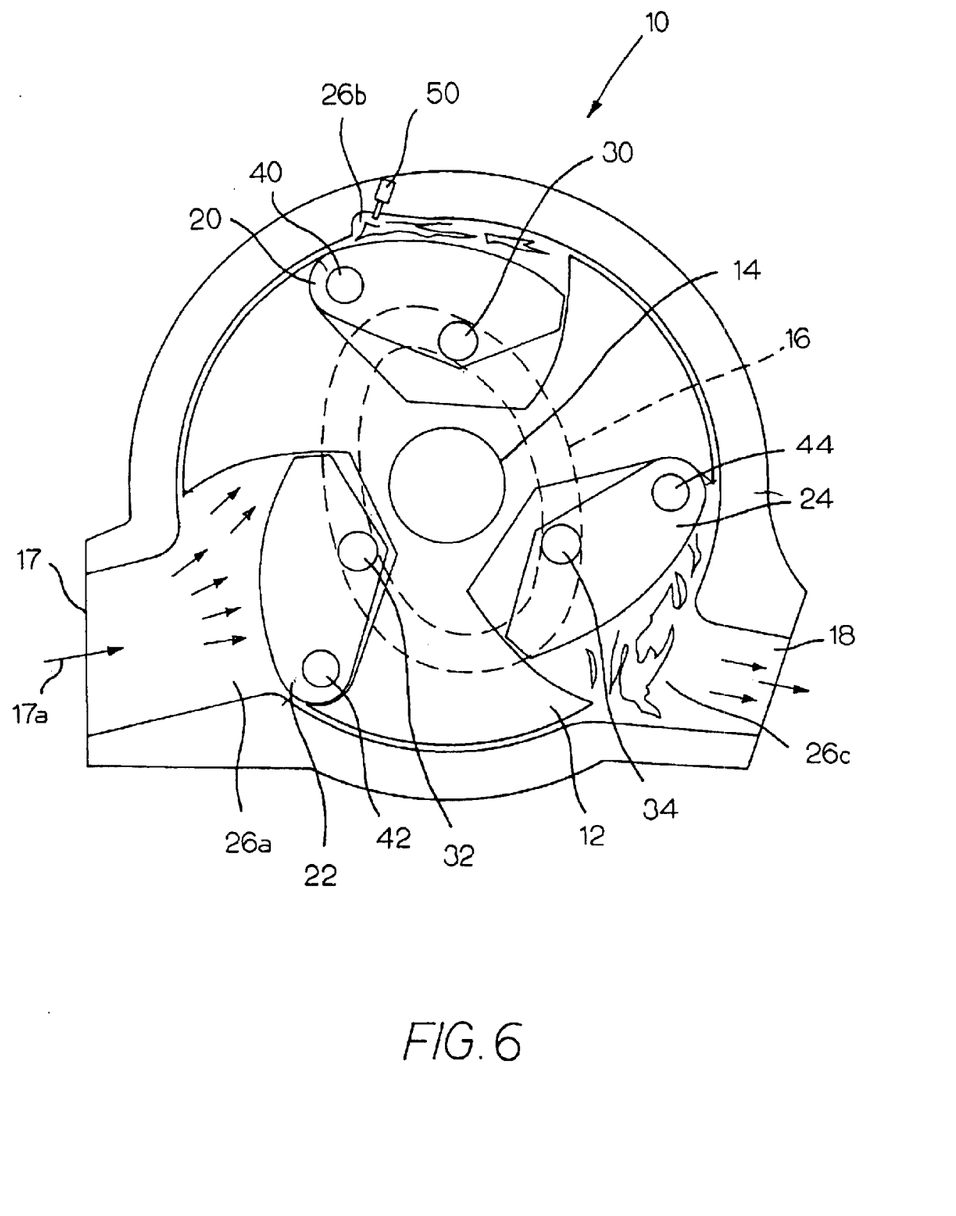
FIG. 6 is a simplified sectional view of a preferred internal combustion engine of FIG. 5, again illustrating the operation of the engine.
Figure 7:
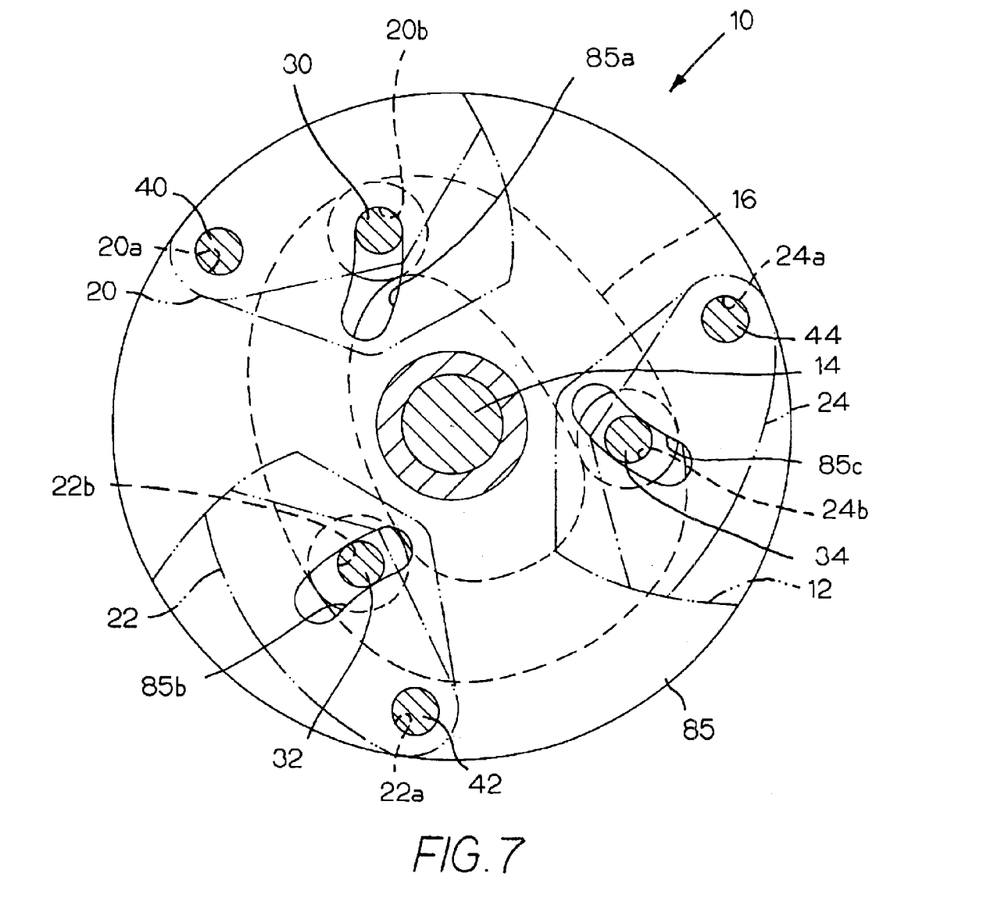
FIG. 7 is a partial sectional view of the preferred internal combustion engine similar to that of FIG. 3 with the torque wheel and associated combustion gates indicated in phantom.
Figure 8:
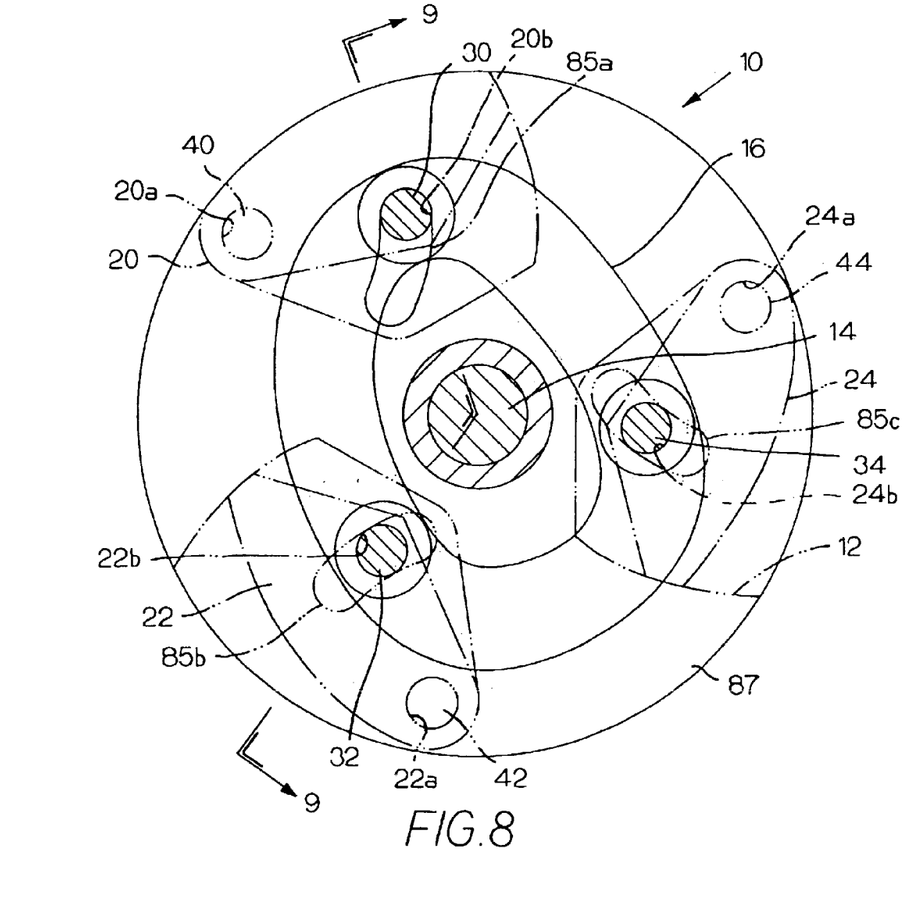
FIG. 8 is a partial sectional view of the preferred internal combustion engine similar to that of FIG. 4 with the torque wheel and associated combustion gates indicated in phantom.

Referring now to the simplified sectional views of FIGS. 5 and 6, in operation, as with other engines, a starter (not shown) is used to commence rotation of the torque wheel 12. As the torque wheel 12 rotates clockwise, air is drawn into the housing of the combustion engine 10 through an intake 17, as indicated by arrow 17a, and into a portion of the combustion chamber generally indicated by reference numeral 26a. At the same time, a fuel injector 60 (as shown in FIG. 2) introduces fuel into the portion of the combustion chamber 26a. As the torque wheel 12 continues its rotation, the fuel/air mixture is compressed by the outward movement of the combustion gate 22, as dictated by the elliptical cutouts 16.

The fuel/air mixture is then compressed and rotated until the combustion gate has been moved to its most outward position at the vertex of the elliptical cutout 16, the position of combustion gate 20 in FIG. 5, where an outer portion of the combustion chamber 26b is defined in the wall of the housing of the engine 10. At this point, a spark plug 50 is used to ignite the fuel/air mixture, causing a rapid expansion of the resultant combustion gases, thus imparting a torque on the torque wheel 12 that causes continued rotation of the torque wheel 12. In this regard, it is preferred that a cavity 21 be defined in the external surface of the combustion gate 20. Similar cavities (not shown) are also defined the respective external surfaces of the other combustion gates 22, 24. This cavity 21 serves as an inner combustion chamber that is in alignment with the aforementioned outer portion of the combustion chamber 26b when the spark plug 50 fires. Such a cavity 21 is shaped to cooperate with the outer portion of the combustion chamber 26b, thus creating a split combustion chamber that ensures that combustion efficiently applies a clockwise torque on the torque wheel 12. As illustrated in FIGS. 2 and 5, this split combustion chamber is substantially rectangular in nature, which experimentation has indicated is optimal for controlling and directing the forces of combustion for maximum torque. Furthermore, in this preferred embodiment, the substantially rectangular split combustion chamber has a ratio of length to width to height of 3:1:1, with approximately one-half of the volume of the split combustion chamber being the volume of the cavity 21. Nevertheless, a wide range of dimensions may be possible without departing from the spirit and scope of the present invention.

With respect to the split combustion chamber, aside from its role in ensuring that combustion efficiently applies a clockwise torque on the torque wheel 12, it is estimated that a significant percentage of remaining emissions (i.e., combustion or exhaust gases) in the outer portion of the combustion chamber 26b are re-burned, improving efficiency and reducing emissions.

As the torque wheel 12 continues its clockwise rotation, the elliptical cutouts 16 cause the combustion gate to move inwardly toward the center of the torque wheel 12, allowing the combustion gases to expand without damaging the engine, as illustrated by the position of combustion gate 24 in FIG. 5. Finally, as the torque wheel 12 approaches the portion of the combustion chamber indicated by reference numeral 26c, the elliptical cutouts 16 cause the combustion gate 24 to move outwardly again, forcing the combustion gases through an exhaust outlet 18. As rotation of the torque wheel 12 continues, the combustion gate is then again moved inwardly, to repeat the cycle, air being drawn into the portion of the combustion chamber indicated by reference numeral 26a.

Referring again to the sectional view of FIG. 1, as the torque wheel 12 rotates, the crankshaft 14 is similarly rotated. A reduction gearing arrangement 100 is then used to reduce and impart rotation to an output shaft 102. As a further refinement, although not shown in the Figures, an oil pump associated with the engine 10 may also be powered by appropriate gearing to the reduction gearing arrangement 100.

As a further refinement to the preferred engine 10 of the present invention, it is contemplated and preferred that each of the cam guide pins 30, 32, 34 be provided with respective bushings that are received in the elliptical cutouts 16. As shown in FIG. 1, each cam guide pin 30 is provided with four bushings 31a, 31b, 31c, 31d which are received in pairs in the identical elliptical cutouts 16 defined in the cam cutout plates 85, 86.

Figure 9:
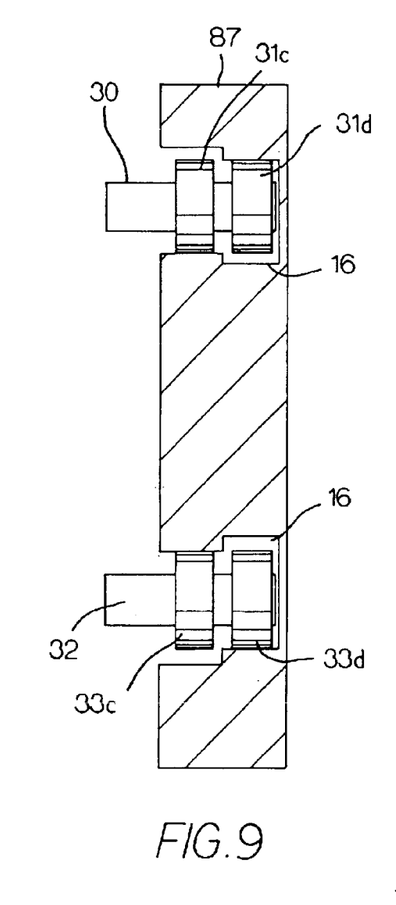
FIG. 9 is a sectional view of the preferred internal combustion engine of FIG. 8 taken along line 9—9 of FIG. 8.

Referring now to the sectional view of FIG. 9, it can be seen that each preferred elliptical cutout 16 actually has a stair-step cross-section for receiving the pairs of guide bushings 31c, 31d, 33c, 33d associated with the cam guide pins 30, 32. Referring specifically to the cam guide pin 30, by constructing the preferred elliptical cutout 16 with such a stair-step cross-section, one bushing 31c abuts a lower side wall of the elliptical cutout 16 while the second bushing 31d abuts an upper side wall of the elliptical cutout 16. Thus, although some tolerance is provided for vertical movement of the cam guide pin 30 relative to the elliptical cutout 16, the stair-step construction of the elliptical cutout 16 and relationship with the bushings 31c, 31d prevents dramatic movements of the guide pin 30 which could impede optimal performance of the engine 10.

Reviewing the various sectional views of the preferred engine 10 of FIGS. 1–4, it can be seen that the engine 10 in this preferred embodiment of the present invention also includes various auxiliary components that improve its operation and efficiency. For example, the engine 10 has an appropriate lubrication system. In this preferred embodiment, an oil pump (not shown), which may be powered by appropriate gearing to the reduction gearing arrangement 100, supplies oil into the elliptical cutouts 16 defined in the respective cam cutout plates 86, 87, preferably into the top and sides of the cutouts 16. In this manner, supplied oil is provided to and around each cam guide pin 30, 32, 34 and their respective bushings, which are received in pairs in the elliptical cutouts 16. Furthermore, although not shown in the Figures, it is contemplated and preferred that the cam guide pins 30, 32, 34 be provided with oil holes that allow circulation of oil through the cam guide pins 30, 32, 34.

From the elliptical cutouts 16, oil is drawn into the central cavity defined by the housing of the engine 10 through the curved slots in the respective seal plates 84, 85 which allow the cam guide pins 30, 32, 34 to pass through the seal plate 84, 85. As an additional refinement, it is contemplated that additional slots be drilled through the respective seal plates 84, 85 to allow for oil flow to the central cavity. Once introduced into the central cavity, oil flows about the torque wheel 12. Furthermore, as shown in FIG. 2, the preferred engine 10 includes channels 72 that allow oil to circulate under the respective combustion gates 20, 22, 24. The combustion gates 20, 22, 24 are themselves provided with oil holes that allow for lubrication of the respective pivot pins 40, 42, 44.

Oil is preferably drained through drain tubes positioned on either side of roller bearings supporting the crankshaft 14. Furthermore, there are preferably drain tubes in liquid communication with the lower portions of the elliptical cutouts 16 defined in the respective cam cutout plates 86, 87. Lastly, a drain tube may be provided into the central cavity of the engine 10 through the sleeve 88 to allow for the drainage of oil that escape around the combustion gates 20, 22, 24. Each of the above-described drain tubes delivers oil to an oil pan or similar receptacle for subsequent pumping and re-circulation into the engine 10.

Furthermore, as shown in FIG. 1, the preferred engine 10 includes a cooling system comprised of water cooling jackets 70 surrounding the central components of the engine 10 and an associated water pump 71 to supply the cooling jackets 70.

Finally, as mentioned above, the most pronounced disadvantage of a rotary piston engine is the difficulty in adequately sealing the enclosed spaces between the piston and the wall of the combustion chamber. Therefore, sealing the enclosed volumes that are manipulated by the combustion gates 20, 22, 24 is also important to the present invention.

Referring now to FIG. 10, the preferred engine 10 includes multiple seals, which are preferably constructed of a carbon cast alloy. Of course, other appropriate materials, including bronze, can be used to construct the seals without departing from the spirit and scope of the present invention.

First, as illustrated in FIG. 10, each of the seal plates 84, 85 has a series of interconnected slots defined in the surface thereof in a somewhat hexagonal pattern about its periphery. Received in these slots are elongated seals, labeled with references numerals 121, 122, 123, 124, 125, 126 with respect to the seal plate 84, and 131, 132, 133, 134, 135, 136 with respect to the seal plate 85. Although not shown in the Figures, it is contemplated and preferred that compression springs be positioned in the slots at spaced intervals (e.g., one inch intervals) below the elongated seals 121, 122, 123, 124, 125, 126, 131, 132, 133, 134, 135, 136 to bias them away from the seal plates 84, 85 to maintain an appropriate seal between the seal plates 84, 85 and the cam cutout plates 86, 87 when the engine is assembled.

Secondly, interposed between the distal ends of the elongated seals 121, 122, 123, 124, 125, 126, 131, 132, 133, 134, 135, 136 are star-shaped sealing members, each indicated by reference numeral 170, which serve to interconnect the elongated seals 121, 122, 123, 124, 125, 126, 131, 132, 133, 134, 135, 136 arrayed about the periphery of the respective seal plates 84, 85, as is further described below with respect to FIG. 12.

Thirdly, on the outer surface of each arm of the torque wheel 12, two parallel slots are defined for receiving elongated seals 140, 142, 144, 146, 148, 150. These elongated seals 140, 142, 144, 146, 148, 150 are designed to seal the torque wheel 12 relative the sleeve 88 (as shown in FIGS. 1–4) in which it is rotating. As illustrated in FIG. 10, it is contemplated and preferred that each of these elongated seals 140, 142, 144, 146, 148, 150 extend outwardly beyond the sides of the torque wheel 12 such that the seals 140, 142, 144, 146, 148, 150 are also interposed between the respective seal plates 84, 85 and the circumferential sleeve 88. Although not shown in the Figures, it is contemplated and preferred that compression springs also be positioned in the slots defined in the outer surface of each arm of the torque wheel 12 at spaced intervals below the elongated seals 140, 142, 144, 146, 148, 150 to bias them away from torque wheel 12 to maintain an appropriate seal between the torque wheel 12 and circumferential sleeve 88 when the engine is assembled.

Figure 11A:
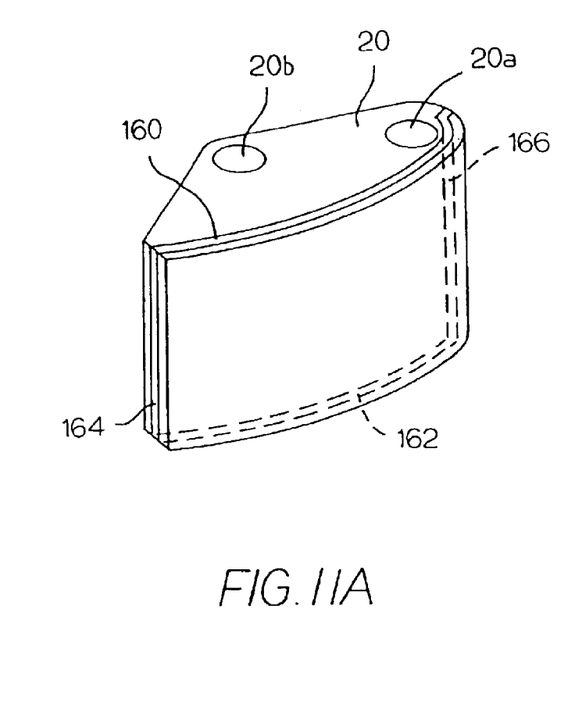
FIG. 11A is a perspective view of a combustion gate of the preferred engine of FIG. 1, illustrating the positioning and orientation of the preferred seals.
Figure 11B:
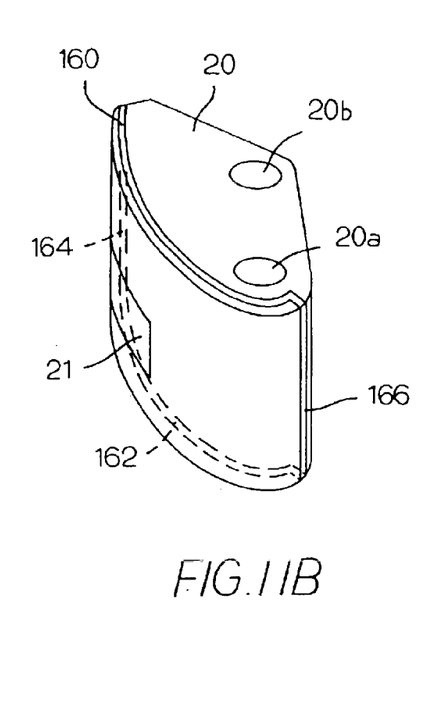
FIG. 11B is an alternate perspective view of a combustion gate of the preferred engine of FIG. 1, illustrating the positioning and orientation of the preferred seals.
Figure 11C:
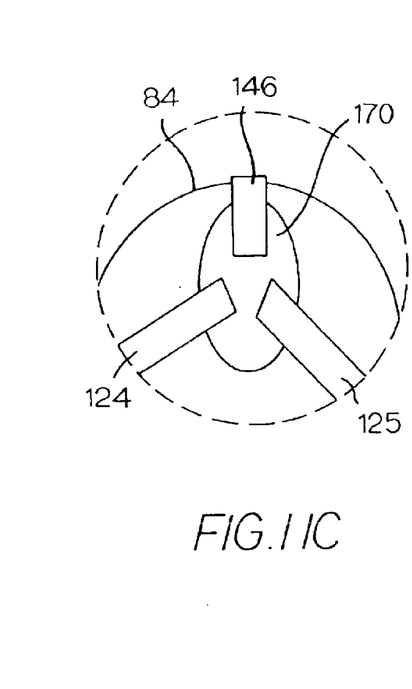

Lastly, FIGS. 11A and 11B are perspective views of one combustion gate 20, illustrating the positioning and orientation of preferred seals. Specifically, the combustion gate 20 has series of interconnected slots defined in the outward external surface thereof. Received in these interconnected slots are elongated seals 160, 162, 164, 166. Similar seals are also installed on each of the other combustion gates 22, 24. As with the various seals described above, although not shown in the Figures, it is contemplated and preferred that compression springs also be positioned in the slots defined in the surface of the combustion gates 20, 22, 24 at spaced intervals below the seals to bias them away from the combustion gates 20, 22, 24 to maintain an appropriate seal.

FIG. 12 is an enlarged view of one of the star-shaped sealing members 170 which serves to interconnect the elongated seals arrayed about the periphery of the respective seal plates 84, 85 of the preferred engine of FIG. 1. As shown, not only does the star-shaped sealing member 170 receive and interconnect elongated seals 124, 125, it also receives and interconnects the elongated seal 146 that extends outwardly beyond the side of the torque wheel 12 when the engine 10 is assembled.

An internal combustion engine constructed in accordance with the above specification avoids the problems of common reciprocating motion, piston-type engines and those of rotary combustion engines. Unlike a reciprocating motion, piston-type engine, minimal fuel and air for each combustion is needed since it is not necessary to force a piston a substantial vertical distance within a cylinder. Rather, since the torque wheel 12 has a substantial mass and inertia, a relatively small combustion that acts on the periphery of the spinning torque wheel 12 is sufficient to drive the torque wheel 12. In this regard, with respect to the preferred embodiment of the engine 10 described above, for every two revolutions of the crankshaft, there are six relatively small, controlled explosions as opposed to the one large explosion necessary to drive a position within a cylinder.

Furthermore, when a piston-cylinder arrangement is used, an offset crankshaft is necessary for transforming the energy from linear motion into rotational motion, resulting in a loss of efficiency. Similarly, a rotary piston engine requires an offset crankshaft due to the eccentric movement of the rotary piston within the combustion chamber. The torque wheel 12 of the preferred engine 10 of the present invention is directly secured to the crankshaft 14 so there is no transformation of energy. The crankshaft 14 rotates with the torque wheel 12. In this regard, its is preferred that the engine 10 of the present invention be run at a constant rotational speed (RPM) in conjunction with a transmission designed to control the output speed.

It will be obvious to those skilled in the art that other modifications may be made to the invention as described herein without departing from the spirit and scope of the present invention.

What is claimed is:

1. An internal combustion engine, comprising:

a housing defining a central cavity;

a torque wheel mounted for rotation within the central cavity defined by said housing and driving a crankshaft, said torque wheel having a plurality of arms in a spaced arrangement about the center of said torque wheel, thereby defining a plurality of corresponding volumes between the respective arms;

a plurality of substantially identical combustion gates positioned within said corresponding volumes, each of said combustion gates being mounted for rotation within a respective volume about a pivot pin;

a pair of cam cutout plates positioned on either side of the torque wheel and within the central cavity defined by said housing, an elliptical cutout being defined in each cam cutout plate with a cam guide pin passing through each combustion gate and being received in the elliptical cutouts defined in each cam cutout plate, such that the elliptical cutouts serve as a track to guide the movement of the combustion gates; and a pair of seal plates, a seal plate being positioned on either side of said torque wheel, slots being defined through said seal plates such that the cam guide pins associated with the respective combustion gates pass through the seal plates and are received in the elliptical cutouts;

wherein, as said torque wheel rotates, air is drawn into the central cavity of said housing and fuel is introduced into the central cavity of said housing to create a fuel/air mixture in one of said volumes between the respective arms of said torque wheel and adjacent one of said combustion gates, said fuel/air mixture being compressed during the continuing rotation of said torque wheel by the pivoting and outward movement of said one combustion gate as dictated by the elliptical cutouts, said fuel/air mixture then being ignited, causing a rapid expansion of combustion gases and imparting a torque that causes continued rotation of said torque wheel, the elliptical cutouts then causing said one combustion gate to pivot and move inwardly toward the center of said torque wheel, allowing said combustion gases to expand, and then said elliptical cutouts causing said one combustion gate to pivot and move outwardly again, forcing said combustion gases through an exhaust outlet.

2. The internal combustion engine as recited in claim 1, and further comprising a circumferential sleeve positioned within said central cavity between said housing and said torque wheel, said torque wheel, said combustion gates, and said seal plates functioning as a unitary body that rotates within said circumferential sleeve.

3. The internal combustion engine as recited in claim 2, wherein said circumferential sleeve is composed of cast iron.

4. The internal combustion engine as recited in claim 2, wherein each arm of said torque wheel defines one or more slots in an external surface thereof, each of said slots receiving an elongated seal to seal said torque wheel relative to said sleeve.

5. The internal combustion engine as recited in claim 4, and further comprising compression springs positioned in said slots at spaced intervals to bias said elongated seals away from said torque wheel.

6. The internal combustion engine as recited in claim 1, in which each of said cam guide pins is provided with four bushings which are received in pairs in the elliptical cutouts defined in the cam cutout plates, each elliptical cutout having a stair-step cross-section for receiving the pairs of guide bushings associated with each of the cam guide pins, one bushing of each pair abutting a lower side wall of the elliptical cutout and the second bushing abutting an upper side wall of the elliptical cutout.

7. The internal combustion engine as recited in claim 1, wherein each of said seal plates has a series of interconnected slots defined in the surface thereof about its periphery, elongated seals being received in these slots to maintain an appropriate seal between said seal plates and said torque wheel.

8. The internal combustion engine as recited in claim 7, and further comprising compression springs positioned in said slots at spaced intervals to bias said elongated seals away from said seal plates.

9. The internal combustion engine as recited in claim 7, and further comprising star-shaped sealing member interposed between the distal ends of adjacent elongated seals to interconnect said adjacent elongated seals.

10. The internal combustion engine as recited in claim 1, wherein each of said combustion gates has a series of interconnected slots defined in the outward external surface thereof, each of said slots receiving an elongated seal.

11. The internal combustion engine as recited in claim 10, and further comprising compression springs positioned in said slots at spaced intervals to bias said elongated seals away from each said combustion gate.

12. An internal combustion engine, comprising:

a housing defining a central cavity;

a torque wheel mounted for rotation within the central cavity defined by said housing and driving a crankshaft, said torque wheel having a plurality of arms in a spaced arrangement about the center of said torque wheel, thereby defining a plurality of corresponding volumes between the respective arms;

a plurality of substantially identical combustion gates positioned within said corresponding volumes, each of said combustion gates being mounted for rotation within a respective volume about a pivot pin; and a pair of cam cutout plates positioned on either side of the torque wheel and within the central cavity defined by said housing, an elliptical cutout being defined in each cam cutout plate with a cam guide pin passing through each combustion gate and being received in the elliptical cutouts defined in each cam cutout plate, such that the elliptical cutouts serve as a track to guide the movement of the combustion gates;

wherein, as said torque wheel rotates, air is drawn into the central cavity of said housing and fuel is introduced into the central cavity of said housing to create a fuel/air mixture in one of said volumes between the respective arms of said torque wheel and adjacent one of said combustion gates, said fuel/air mixture being compressed during the continuing rotation of said torque wheel by the pivoting and outward movement of said one combustion gate as dictated by the elliptical cutouts, said fuel/air mixture then being ignited, causing a rapid expansion of combustion gases and imparting a torque that causes continued rotation of said torque wheel, the elliptical cutouts then causing said one combustion gate to pivot and move inwardly toward the center of said torque wheel, allowing said combustion gases to expand, and then said elliptical cutouts causing said one combustion gate to pivot and move outwardly again, forcing said combustion gases through an exhaust outlet; and wherein each of said combustion gates defines a cavity in the external surface thereof that cooperates with an outer combustion chamber defined in the wall of said housing of the engine, thus creating a split combustion chamber, said fuel/air mixture being ignited in said split combustion chamber.

13. The internal combustion engine as recited in claim 12, in which said split combustion chamber is substantially rectangular in nature.

14. The internal combustion engine as recited in claim 13, in which said split combustion chamber has a ratio of length to width to height of 3:1:1.

15. The internal combustion engine as recited in claim 14, in which approximately one-half of the volume of said split combustion chamber is the volume of the cavity defined in the external surface of each combustion gate.

16. A method for achieving a four-stroke combustion cycle, comprising the steps of:

mounting a torque wheel for rotation in a combustion chamber defined by a housing, said torque wheel having a plurality of arms in a spaced arrangement about the center of said torque wheel, thereby defining a plurality of corresponding volumes between the respective arms;

positioning a plurality of substantially identical combustion gazes within said corresponding volumes between the respective arms of said torque wheel, each of said combustion gates being mounted for rotation within a respective volume about a pivot pin and each of said combustion gates defining a cavity in the external surface thereof that cooperates with an outer combustion chamber defined in the wall of said housing, thus creating a split combustion chamber;

providing a means for pivoting each combustion gate within its respective volume and about said pivot pin as said torque wheel rotates;

initiating rotation of said torque wheel such that air is drawn into a portion of said combustion chamber adjacent one of said combustion gates;

introducing fuel into the portion of said combustion chamber adjacent one of said combustion gates to create a fuel/air mixture in one of said volumes between the respective arms of said torque wheel, said fuel/air mixture being compressed during the continuing rotation of the said torque wheel by the pivoting and outward movement of said one combustion gate;

igniting said compressed fuel/air mixture in said split combustion chamber, causing a rapid expansion of combustion gases and imparting a torque that causes continued rotation of said torque wheel, said one combustion gate then pivoting and moving inwardly toward the center of said torque wheel, allowing said combustion gases to expand, and then said one combustion gate pivoting and moving outwardly, forcing said combustion gases through an exhaust outlet.

17. The method for achieving a four-stroke combustion cycle as recited in claim 16, wherein a means for pivoting each combustion gate is an elliptical cutout, a cam guide pin passing through each combustion gate and being received in the elliptical cutout such that the elliptical cutouts serves as a track to guide the movement of the combustion gate during rotation of the torque wheel.

18. The method for achieving a four-stroke combustion cycle as recited in claim 17, wherein said split combustion chamber is substantially rectangular in nature.

19. The method for achieving a four-stroke combustion cycle as recited in claim 18, wherein said split combustion chamber has a ratio of length to width to height of 3:1:1.

20. The method for achieving a four-stroke combustion cycle as recited in claim 17, wherein approximately one-half of the volume of said split combustion chamber is the volume of the cavity defined in the external surface of each combustion gate.

* * * * *

UNITED STATES PATENT AND TRADEMARK OFFICE
CERTIFICATE OF CORRECTION

PATENT NO. : 6,796,285 B2
DATED : September 28, 2004
INVENTOR(S) : Mark D. Karnes It is certified that error appears in the above-identified patent and that said Letters Patent is hereby corrected as shown below:

Column 11,
Line 51, replace the word "gazes" with -- gates --.

Signed and Sealed this

Fourteenth Day of December, 2004

JON W. DUDAS
*Director of the United States Patent and Trademark Office*